(12) United States Patent
Mridha et al.

(10) Patent No.: US 9,122,629 B2
(45) Date of Patent: Sep. 1, 2015

(54) ELASTIC CACHE WITH SINGLE PARITY

(75) Inventors: Debal K. Mridha, Bangalore (IN); Luca Bert, Cumming, GA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 181 days.

(21) Appl. No.: 13/605,254

(22) Filed: Sep. 6, 2012

(65) Prior Publication Data

US 2014/0068181 A1 Mar. 6, 2014

(51) Int. Cl.
*G06F 12/08* (2006.01)
*G06F 11/10* (2006.01)

(52) U.S. Cl.
CPC .......... *G06F 11/108* (2013.01); *G06F 12/0871* (2013.01); *G06F 2211/1009* (2013.01); *G06F 2211/1059* (2013.01); *G06F 2212/222* (2013.01); *G06F 2212/283* (2013.01); *G06F 2212/285* (2013.01); *G06F 2212/311* (2013.01); *G06F 2212/403* (2013.01); *G06F 2212/7208* (2013.01)

(58) Field of Classification Search
CPC ....................................................... G06F 12/08
USPC .......... 711/103, 113, 114, 122, 128, E12.017; 714/E11.034; 365/185.03
See application file for complete search history.

(56) References Cited

U.S. PATENT DOCUMENTS

| 5,586,291 A * | 12/1996 | Lasker et al. ................. 711/113 |
| 2007/0079068 A1 | 4/2007 | Draggon |
| 2010/0125695 A1* | 5/2010 | Wu et al. ........................ 711/103 |
| 2010/0199036 A1* | 8/2010 | Siewert et al. ................ 711/112 |
| 2010/0293337 A1* | 11/2010 | Murphy et al. ................ 711/136 |
| 2012/0110247 A1* | 5/2012 | Eleftheriou et al. .......... 711/103 |
| 2012/0173790 A1* | 7/2012 | Hetzler et al. ................ 711/103 |

OTHER PUBLICATIONS

Qin et al, "A Comparative Evaluation of Cache Strategies for Elastic Caching Platforms", Quality Software (QSIC), 2011 11th International Conference, Jul. 13-14, 2011, pp. 166-175.*

* cited by examiner

*Primary Examiner* — Cheng-Yuan Tseng
*Assistant Examiner* — Kamal K Dewan
(74) *Attorney, Agent, or Firm* — Suiter Swantz pc llo (57) ABSTRACT

The invention provides an elastic or flexible SSD cache utilizing a hybrid RAID protocol combining RAID-0 protocol for read data and RAID-5 single parity protocol for write data in the same cache array. Read data may be stored in window sized allocations using RAID-0 protocol to avoid allocating an entire RAID stripe for read cache data. In the same SSD volume, dirty write data is stored in row allocations using RAID-5 protocol to provide single parity for the dirty write data. Read data is typically stored a window from the physical device having the largest number of available windows. Write data is stored in a row including the next available window in each arm, which decouples the window structure of the rows from the stripe configuration of the physical memory devices.

24 Claims, 6 Drawing Sheets

Metadata Correspondence Table 50

| RAID-5 Row | Arm-0 Window | Arm-1 Window | Arm-2 Window | ... |
|---|---|---|---|---|
| Row-0 | CS-0-1 | CS-1-1 | CS-2-0 | ... |
| Row-1 | CS-0-3 | CS-1-2 | CS-2-2 | ... |
| Row-2 | CS-0-6 | CS-1-6 | CS-2-5 | ... |
| ⋮ | ⋮ | ⋮ | ⋮ | |

*FIG. 5*

ELASTIC CACHE WITH SINGLE PARITY

TECHNICAL FIELD

The present invention relates to Solid State Device (SSD) cache and Random Array of Independent Disks (RAID) data storage systems. More particularly, the invention relates to an elastic SSD cache combining RAID-0 protocol for read data and RAID-5 single parity protocol for write data.

BACKGROUND

Directly Attached Storage (DAS) systems typically include High Density Drive (HDD) attached memory storage devices that provide permanent memory and Solid State Device (SSD) memory storage devices that serve as cache memories. The SSDs provide relatively expensive memory with much faster read and write times in comparison to the HDDs. A relatively small amount of SSD cache can therefore be cost effectively provided as temporary cache memory for recently and frequently accessed data, sometimes referred to as "hot data." Using an SSD cache memory avoids the read and write latency inherent in the HDDs for recently and frequently accessed data.

Tiered cache systems (e.g., "Cachecade") have been developed to provide significantly larger amounts SSD memory than conventional single-tier SSD cache. The SSD memory is organized into multiple levels or tiers in which a relatively small primary SSD cache typically resides on a single physical device (typically a memory chip), while the secondary SSD cache includes an array of physical devices (typically several memory chips).

The individual physical devices in the secondary SSD cache array may be referred to as "arms" in the disclosure. Like an array of attached HDDs, the secondary SSD cache array may be configured with any of the Random Array of Independent Disks (RAID) protocols currently existing or developed in the future to improve security of the data stored in the SSD cache array.

In conventional RAID volumes for HDDs, single and double parity protocols are often used to provide parity based data reconstruction in the event of failure or corruption of one or more of the drives. Data mirroring is also popular in RAID systems for HDDs to protect against loss of entire drives or servers. The relatively high cost of SSD memory results in a desire to maximize the utilization of SSD memory in cache systems. Certain memory storage practices used in RAID systems or HDD attached drives may therefore be undesirable in RAID system for SSD cache arrays due to the higher premium placed on memory space in SSD cache systems. However, RAID systems specifically tailored to SSD cache arrays have not adequately addressed this need. There is, therefore, a continuing need for methods and systems for improving the utilization of SSD cache systems. More particularly, there is a need improved memory utilization in RAID systems specifically tailored for SSD cache arrays.

SUMMARY

The invention provides an SSD cache system that meets the needs described above through an elastic or flexible SSD cache utilizing a hybrid RAID protocol combining RAID-0 protocol for read data and RAID-5 single parity protocol for write data in the same cache array. Read data is stored in window sized allocations using RAID-0 protocol to avoid allocating an entire single parity RAID row for read cache data. In the same SSD volume, dirty write data is stored in stripe sized row allocations using RAID-5 protocol to provide single parity for the write data. This is advantageous because another copy of the read cache data is already stored in the HDD permanent memory, while the dirty write data has not yet been written to the attached drives.

Efficiency in implementing this type of elastic cache for storing RAID-0 data along with RAID-5 data with single parity in the same volume is improved by decoupling the RAID-5 rows from the physical stripe configuration typically employed in RAID-5 volumes. Each time read data is requested, a RAID-0 window is allocated from the arm with the most windows available. For write data, a RAID-5 row is allocated from the next available window in each physical device regardless of the stripe structure of the array. As a result, the allocated RAID-5 row does not necessarily correspond to a physical stripe across the physical arms as in conventional RAID volumes. The elastic cache system keeps track of the windows forming the RAID-5 rows through metadata correlating the RAID-5 windows to the corresponding physical windows stored in the arms of the SSD cache. The metadata is typically updated each time a RAID-5 row is allocated to allow for efficient loading RAID-0 read windows and RAID-5 write rows into the same cache array on the fly as the data storage requirement develops.

Generally described, the invention may be embodied in an elastic cache system for non-transitory storage of electronic computer data. The array of physical memory devices, or arms, is divided into a stripe configuration in which each stripe includes one window of like size from each arm. Single parity rows (i.e., one window in each arm) are decoupled from the stripe structure of the physical arms and metadata keeps track of the correlation between the single parity rows and the windows of the physical arms. A cache controller loads the physical memory devices with a combination of no-parity read data blocks and single-parity write data blocks. An individual window is allocated for each block of read data, while a single-parity row including a window from each physical memory device (arm) is allocated for write data. The read data is stored in no-parity format while the write data is stored in a single-parity format. The rows storing write data are not bound to the stripes of the physical memory device, which decouples the single-parity rows from the stripe configuration of the physical memory devices. The cache controller therefore updates the metadata when storing write data to correlate the windows of the single-parity rows to the stripe configuration of the physical arms.

In a particular embodiment, the read data is stored in RAID-0 format and the write data is stored in RAID-5 format. The metadata may be stored in any desired location, typically in a portion of memory in the physical memory devices, although other locations in the host computer system may be used. An elastic cache may be implemented in an SSD cache array, such as multiple chips in a secondary SSD array in a tiered cache system. It is contemplated that other types of cache memory could also be employed.

As a specific example of the data loading methodology for the elastic cache, in response to receiving a read request, the cache controller may allocate a single window in the physical device with the highest number of available windows. In response to receiving a write request, the cache controller may allocate a single parity row including the next available window in each physical device, which decouples the single parity row window structure from the stripe configuration of the physical arms. The metadata is therefore updated to keep track of the correlation between the single-parity rows and the stripe configuration of the physical memory devices.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE FIGURES

The numerous advantages of the invention may be better understood with reference to the accompanying figures in which.

DETAILED DESCRIPTION OF ILLUSTRATIVE EMBODIMENTS

The invention may be embodied in an elastic SSD cache system, such as a secondary SSD cache of a tiered cache system that combines RAID-0 protocol for read data with RAID-5 single parity protocol for write data in the same SSD array. Elastic cache may also be referred to as flexible cache and systems combining RAID types may be referred to as hybrid RAID in the disclosure. Read data may be stored in window sized, no-parity allocations using RAID-0 protocol to avoid allocating an entire single parity row for read cache data. In the same SSD volume, dirty write data is stored in single parity row allocations (i.e. one window in each arm regardless of stripe configuration) using RAID-5 protocol to provide single parity for the dirty write data.

RAID memory is typically configured in stripes in the physical devices (arms) with each arm contributing a component window of the same size to the stripe. For descriptive convenience, the component of a single arm forming part of a stripe is referred to as a window. Thus, a stripe is formed by a set of windows, where each physical device (arm) contributes one window of like size to the stripe at the same level of the stripe structure (see FIG. 2). For the purpose of the disclosure, a "row" refers to a set of windows, one from each arm, where each window may be from a different stripe, also shown in FIG. 2. In the disclosure, a "row" may serve as a RAID single parity data structure without corresponding to a stripe in the physical arms.

Solid state cache arrays are becoming prevalent in tiered SSD cache systems, such as the "Cachecade" tiered cache system. Although memory space is at a premium in SSD cache arrays, RAID data storage systems have not been optimized to take into account the special circumstances arising in SSD cache arrays. For example, providing parity for cached read data may be considered unnecessary in SSD cache arrays because a copy of the read data is also stored in the attached HDD drives. However, single parity may still be considered advantageous for dirty write data which does not have another copy stored in the attached drives. In addition, simple mirroring of data drives often employed for DAS attached drives may be considered an unnecessary waste of valuable SSD cache memory in tiered SSD cache systems. With cache space at a premium, single parity data storage for write data without data mirroring may be preferred over full data mirroring for the SSD cache systems. The elastic cache with hybrid RAID structure meets this combination of design objectives in an effective and efficient data locating methodology for SSD cache systems.

In a conventional RAID-5 single parity system, each row extends across a stripe within N+1 drives where N is the number of drives storing user data. The extra drive stores parity data. Due to the expense of SSD memory and the desire to maximize the utilization of SSD cache in the DAS system, parity is not provided for read data, which is stored in RAID-0 windows in the elastic cache system. This is because another copy of the read data already resides in the attached HDD array. On the other hand, RAID-5 with single parity is used to store dirty write data because another copy of the write data has not yet been stored in the HDD array. The hybrid RAID structure of the elastic caches system therefore combines these RAID protocols in the same SSD cache.

In tiered SSD cache systems, SSD arrays are typically used as secondary cache devices in which data is cached in the unit of window size. In some DAS systems, RAID volumes may be constructed from SSDs for simple and easy operation of the cache. In conventional RAID systems for HDDs, RAID-1 is very popular for its simple mirroring mechanism. But in SSD cache arrays, simple mirroring may be considered as waste of SSD memory. Elastic cache mechanisms can therefore be used when only dirty data will be stored with parity. Data mirroring may also be undesirable in SSD cache because even with an elastic cache mechanism, 2× cache space is required for X bytes of dirty data whenever mirroring is provided.

RAID-5 requires a minimum three physical drives and distributes parity along with the data. As the volume may operate with any one drive absent, the data stored in the array is not destroyed by a single drive failure. Upon drive failure, any subsequent reads can be calculated from the distributed parity such that the drive failure is masked from the end user. However, a single drive failure results in reduced performance of the entire array until the failed drive has been replaced and the associated data rebuilt.

A RAID-5 protocol can therefore be used to reduce the cache space requirement for write data by providing single parity rather than data mirroring for data security. However, using traditional RAID-5 logic where each row is strictly bound to a stripe (i.e., row "n" consists of windows from N*row_size to ((N+1)*row_size−1)) results in the allocation of data storage for parity information even where read cache is stored. This destroys the nature of an elastic cache and results in inefficient utilization of the SSD cache memory.

The invention overcomes this concern by providing an elastic cache in which read data is stored as RAID-0 (no parity) format while write data is stored in RAID-5 (single parity) format in the same cache volume. RAID-5 single parity is provided for dirty write data but not for read data, and only a single copy of read and write data is stored in the cache. This technique reduces the cache space used by avoiding data mirroring and instead providing single parity protection for only the dirty write portion of the data in the cache.

The RAID-5 protocol used in the elastic cache differs from the conventional RAID-5 protocol in that the RAID-5 rows are decoupled from the physical data stripe configuration. This allows for efficient loading of the data blocks with read data treated as RAID-0 data and dirty write data treated as RAID-5 data in the same SSD cache volume. The illustrative embodiments of the invention therefore use this modified RAID-5 parity generation mechanism for dirty rows in which the RAID-5 rows are not strictly bound with (decoupled from) the stripes of the physical devices. As individual windows are allocated for read data so there is no waste of cache memory space for read data. A single array therefore stores RAID-0 read data and RAID-5 write data on the fly, as the data storage requirement develops. Metadata correlating RAID-5 rows to physical device windows is stored on each constituent physical drive. For optimization purpose, Metadata may be stored on (N−1) drives. The elastic cache system thereby saves $((N-1)-N/2)*no\_dirty\_row*window\_size$ (cache units of window size) SSD space compare to a simple mirroring method.

In the example data loading methodology of the disclosure, read data is typically stored in a window from the physical device having the largest number of available windows, while write data is typically stored in a row including the next available window in each arm, which decouples the window structure of the rows from the stripe configuration of the physical memory devices. The data loading methodology for the elastic cached combines these two criteria to efficiently load no-parity windows for read data and single-parity rows for write data flexibly and efficiently, without wasting windows in the cache structure, on the fly as the data storage requirement develops.

It should be noted that the invention is not limited to using RAID-0 for read data and RAID-5 single parity for write data. More generally, the invention provides for the combination of a portion of data without parity and a portion of data with single parity in the same volume of data storage devices. For example, the invention may be used with futuristic RAID levels (e.g., RAID-D) in any configuration where user can store some data without any parity and some data with parity including systems where hinting received from the user along with the data to be stored may be used to set the parity type for individual data blocks. The hinting may be any type of direct or indirect indication from the user, system or component indicating the type of parity, or lack of parity, desired for a particular data block, group of data blocks, or classification of data blocks. For example, hinting could be provided by the user for individual data blocks at the time of reading or writing, through preset priority settings set for files, folders or drives, or any other suitable mechanism for indicating desired parity settings for individual data blocks, groups of data blocks, or classifications of data blocks. It should also be appreciated that the present invention is well suited to SSD cache systems, but can be applied to storage volumes generally, including but not limited to attached HDDs in a DAS system.

Figure 1A:
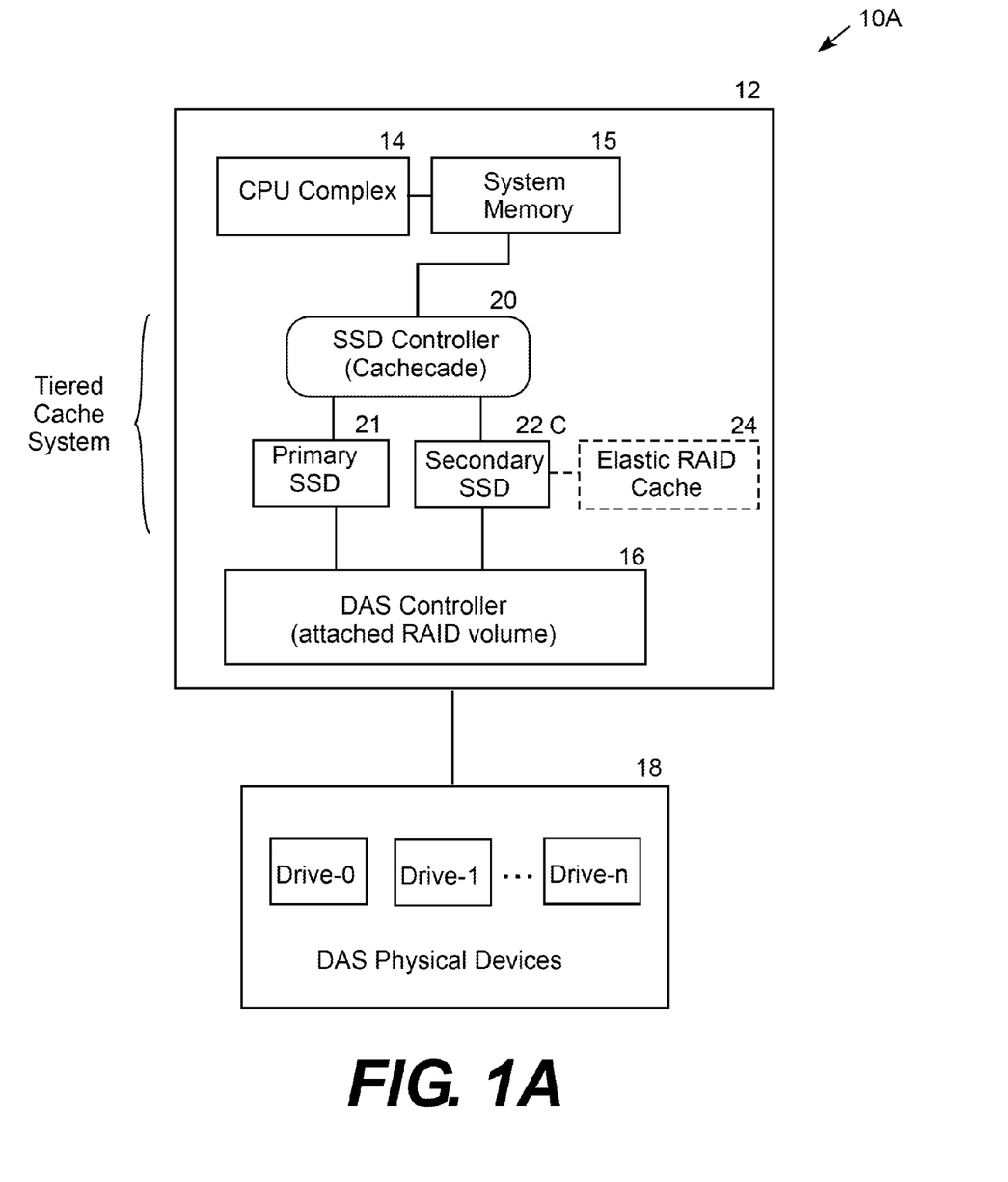
FIG. 1A is a functional block diagram of a typical, simplified example host computer system with a DAS system having a tiered SSD cache system implementing an elastic cache system with a hybrid RAID structure.

FIG. 1A is a block diagram of a first example operating environment for the elastic SSD cache system, computer system 10A. The example computer system 10A includes host computer 12 with a CPU complex 14 and a system memory 15 that utilize a DAS system controller 16 to implement data storage and utilization in the attached HDD storage devices 18 in the ordinary course of computer operations. In this particular example of the invention, an SSD controller ("CacheCade") 20 is used to manage a tiered SSD system including a primary SSD 21 and a secondary SSD array 22. The elastic RAID cache system may be deployed in the secondary SSD array 22 under the management of the SSD controller 16.

Figure 1B:
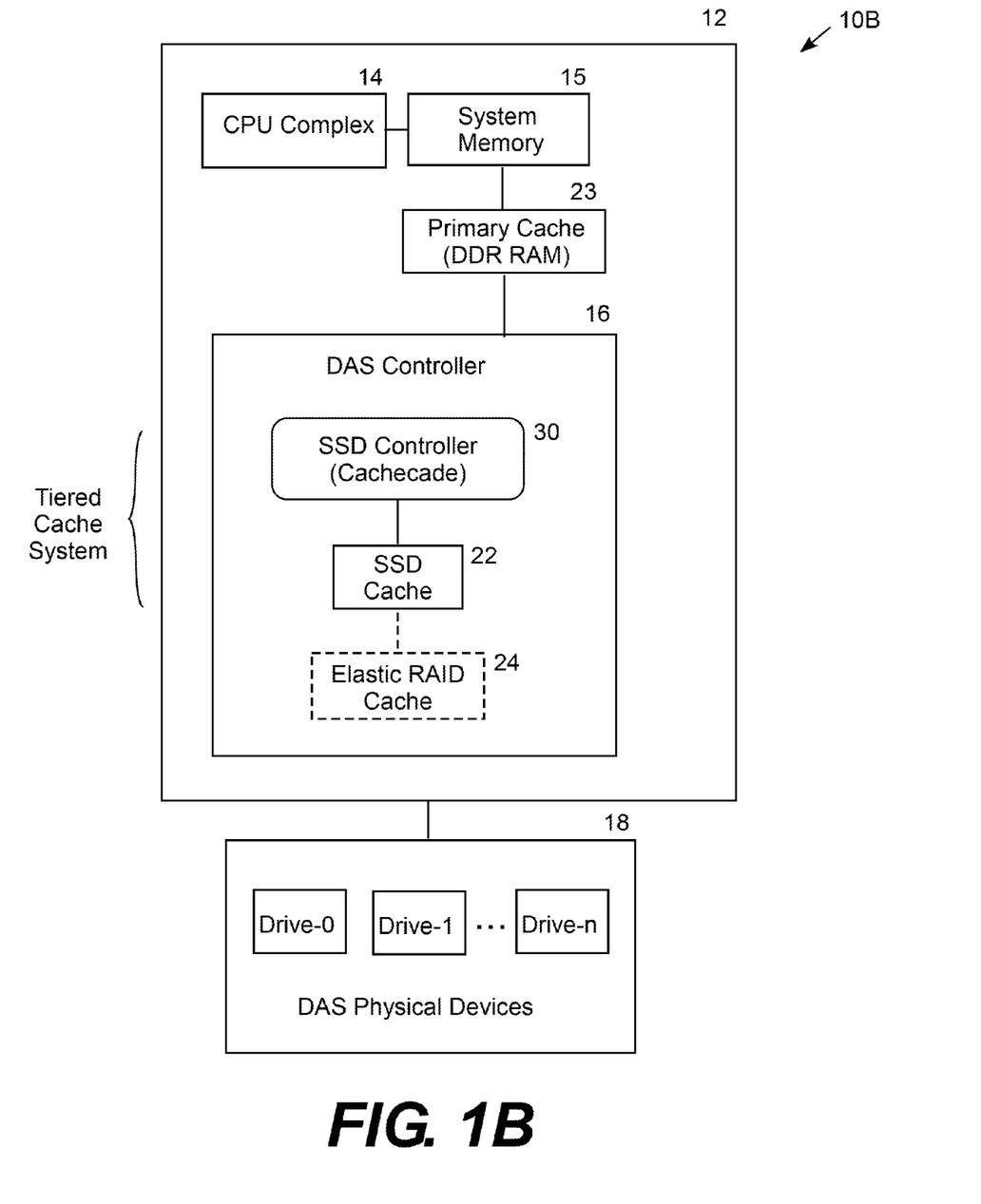
FIG. 1B is an alternative host computer system in which the elastic cache is deployed within a DAS controller of the computer system.

FIG. 1B is an alternative operating environment for the elastic SSD cache system, computer system 10B. The computer system 10B may similar to the computer system 10A except that the SSD Controller 30 and the tiered SSD cache 22 used to implement the elastic cache 24 are deployed within the DAS controller 16. In addition, in this example the primary cache 23 of the host computer may be conventional DDR RAM rather than SSD cache. That is, the SSD used for the elastic cache 24 in this alternative may be provided entirely through the DAS controller. As a result, the underlying host computer need not include any preexisting SSD memory. This alternative embodiment may therefore be implemented through an auxiliary DAS controller comprising the necessary SSD that can be added, as desired, to a host system that may not include preexisting SSD memory.

The computer systems shown in FIGS. 1A and 1B provide example operating environments but do not limit the invention. Of course, actual computer systems embodying the invention will vary in configuration and will typically be much more sophisticated than the minimal examples shown in FIGS. 1A and 1B. Nevertheless, it should be appreciated that these figures illustrates simplified illustrative computer systems with sufficient features to demonstrate the operation of the present invention. While the SSD controller may be located in any other desired location and other SSD configurations may be used to implement the invention, these particular examples are suitable for describing the inventive features of the elastic cache system.

Figure 2:
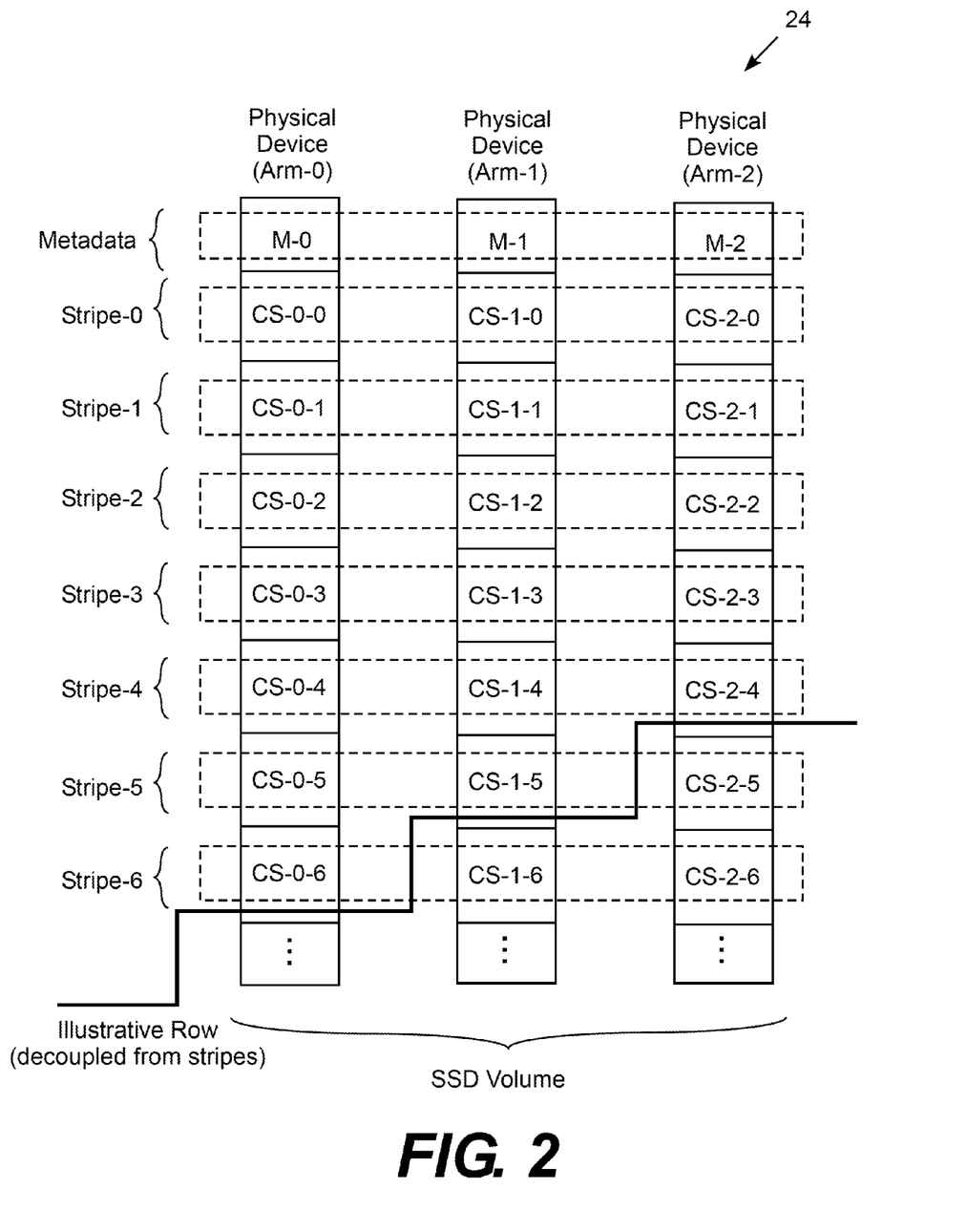
FIG. 2 is a data block diagram of a SSD cache array suitable for the elastic cache system.

FIG. 2 is a memory block diagram of the secondary SSD array 24, which includes the minimum array needed for a RAID-5 volume, consisting of three physical devices or arms, ARM-0, ARM-1 and ARM-2. It will be understood that larger arrays of arbitrary size "N" may be included in the RAID-5 volume, while the minimum array of three physical devices is shown for descriptive convenience. In this particular example, the number of arms is three (N=3). The arms are divided into seven cache stripes (CS-0 through CS-6) and an additional metadata portion (M0, M1 and M-2). Each cache stripe is denoted with a stripe number and each window (a single drive component of a stripe) is further denoted by a window number correspond to the associated arm. Thus, the zero cache stripe includes the windows CS-0-0 in ARM-0, CS-1-0 in ARM-1, and CS-2-0 in ARM-2. Similarly, the number one cache stripe includes the windows CS-0-1 in ARM-0, CS-1-1 in ARM-1, and CS-2-1 in ARM-2. The number two cache stripe includes the windows CS-0-2 in ARM-0, CS-1-2 in ARM-1, and CS-2-2 in ARM-2. The number three cache stripe includes the windows CS-0-3 in ARM-0, CS-1-3 in ARM-1, and CS-2-3 in ARM-2. The number four cache stripe includes the windows CS-0-4 in ARM-0, CS-1-4 in ARM-1, and CS-2-4 in ARM-2. The number five cache stripe includes the windows CS-0-5 in ARM-0, CS-1-5 in ARM-1, and CS-2-5 in ARM-2, and the number six cache stripe includes the windows CS-0-6 in ARM-0, CS-1-6 in ARM-1, and CS-2-6 in ARM-2.

FIG. 2 also shows an illustrative row, which may serve as a single parity RAID-5 data structure in an embodiment of the invention. The row consists of one window from each arm, but the windows of the row may come from different stripes (i.e., the row is decoupled from the stripe structure of the physical arms). In the particular example shown, the illustrative row consists of CS 0-6 from Arm-0, CS 1-5 from Arm-1, and CS 2-4 from Arm-2.

The data block loading methodology includes loading RAID-0 windows for read data in the drive with the most available windows. RAID-5 rows are allocated across the arms regardless of the stripe configuration and metadata is updated each time a RAID-5 row is allocated to keep track of the correspondence between the RAID-5 rows and the windows in the physical arms. While many other specific approaches may be used to load single-parity and no-parity data into a volume, this methodology illustrated the basic logical elements of the elastic cache feature.

Figure 3:
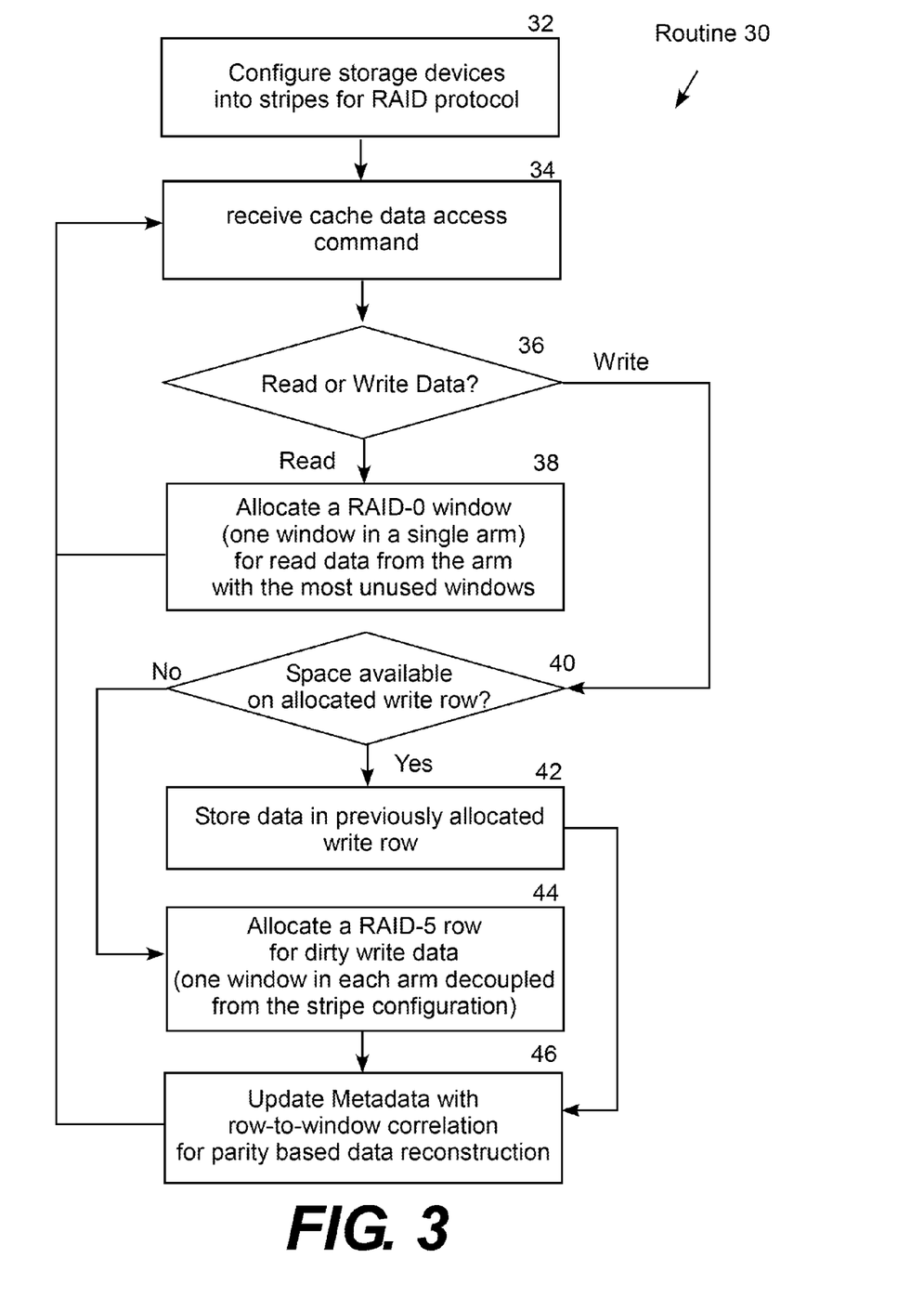
FIG. 3 is a logic flow diagram for allocating data blocks in the elastic cache system.

FIG. 3 is a logic flow diagram illustrating a routine 30 for loading data blocks into the secondary SSD array 24 to implement the elastic cache. In step 32, the SSD array of size "N" (in this example N=3) is configured into cache stripes with an additional portion in each arm reserved for metadata. FIG. 2 provides the N=3 example used here to illustrate the invention. Once the SSD array is provisioned desire format in step 32, data block loading can be commenced in step 34. In step 34, the SSD controller receives a cache data access command, which may be a read request (i.e., read data stored in the attached HDD array that is not already stored in the SSD cache) or a write request (i.e., dirty write data to be temporarily cached until written the attached HDD array). Step 34 is followed by step 36, in which the SSD controller determines whether the data access command is a read request or a dirty write request. If the cache data access command is a read request, step 36 is followed by step 38, in which the SSD controller allocates a RAID-0 window in the arm with the most available windows and stores the read data in the allocated window.

If the cache data access command is a write request, step 36 is followed by step 40, in which the SSD controller determines whether space is available on a previously allocated write row. If space is available on a previously allocated write row, the "Yes" branch is followed to step 42, in which the write data is stored in the available portion of the previously allocated write row. Step 42 is followed by step 46, in which the SSD controller updates the metadata to keep track of the correlation between the RAID-5 rows and the physical strips. If space is not available on a previously allocated write row, the "No" branch is followed to step 44, in which the SSD controller allocates a RAID-5 row consisting of the next available window from each arm regardless of the physical stripe configuration of the row. Step 44 is followed by step 46, in which the SSD controller updates the metadata to keep track of the correlation between the RAID-5 rows and the physical strips. It will also be understood that the metadata in this example is stored in the SSDs forming the elastic cache, but could be stored elsewhere if desired. Following step 46, routine 30 loops back to step 34 so that the data blocks can continue to be loaded in RAID-0 windows and RAID-5 rows in an elastic (flexible) manner, as the data storage requirement develops.

As the data is loaded into the cache on the fly, it will be appreciated that the actual data block configuration loaded into the elastic cache using this methodology may be different each time. It will also be appreciated that other methodologies could be employed to load the cache, while the methodology illustrated is a simple implementation achieving efficient, flexible data block loading in accordance with the invention.

Figure 4:
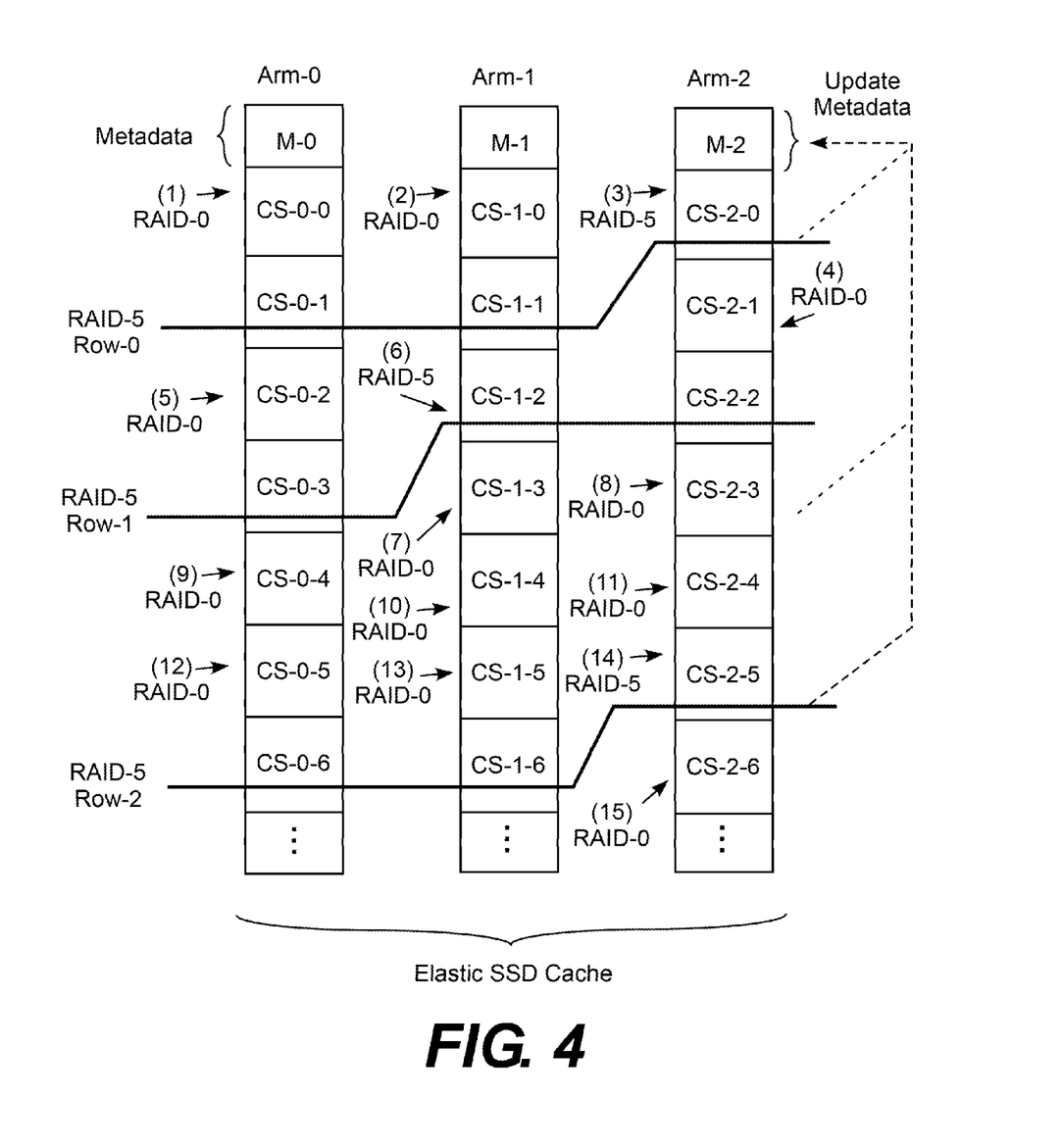
FIG. 4 is a data block diagram of the elastic cache illustrating one particular example data allocation including RAID-0 windows for read data and RAID-5 single parity rows for dirty write data.

FIG. 4 provides one particular example of the data loading according to FIG. 3. The data blocks are shown with a RAID denotation (i.e., RAID-0 for read data or RAID-5 for write data) with a number indicating the order in which the data block were loaded into cache. As noted previously, read windows will be allocated in lowest number arm first when multiple arms have the same number of unassigned widows available and write rows will be allocated in the next available window in each arm. Again, this convention is adopted for illustration purposes and another priority may be adopted if desired.

Turing to a specific example data block (1) is a read block loaded into CS-0-0 as all of the arms have the same number of windows available and arm-0 is the lowest numbered arm. Data block (2) is a read block loaded into CS-1-0. Data block (3) is the first write block received for which Row-0 is allocated, consisting of CS-0-1, CS-1-1 and CS-2-0. Note that Row-0 includes a window from each arm regardless of the stripe structure. The metadata is the therefore updated to correlate the row to the windows of the physical arms. In addition, FIG. 5 includes an illustration of the metadata correspondence table 50. As shown, Row-0 is correlated with CS-0-1, CS-1-1 and CS-2-0. The illustrative table structure is organized to facilitate visualization of the row to the stripe correspondence and the actual table structure may vary.

Data block (3) represents a full RAID-5 row, which may be filled with multiple write data blocks received at different times until the row is filled. It will therefore be understood that data block (3), which is denoted as a single block in FIG. 4 for illustrative convenience, may in practice consist of several write data blocks received at different times until Row-0 is filled. Continuing the data block loading example, after Row-0 has been allocated, data block (4) is a read block loaded into CS-2-1 as ARM-2 has the largest number of available windows. Data block (5) is a read block loaded into CS-0-2 as all of the arms are equally loaded at this point.

Figure 5:
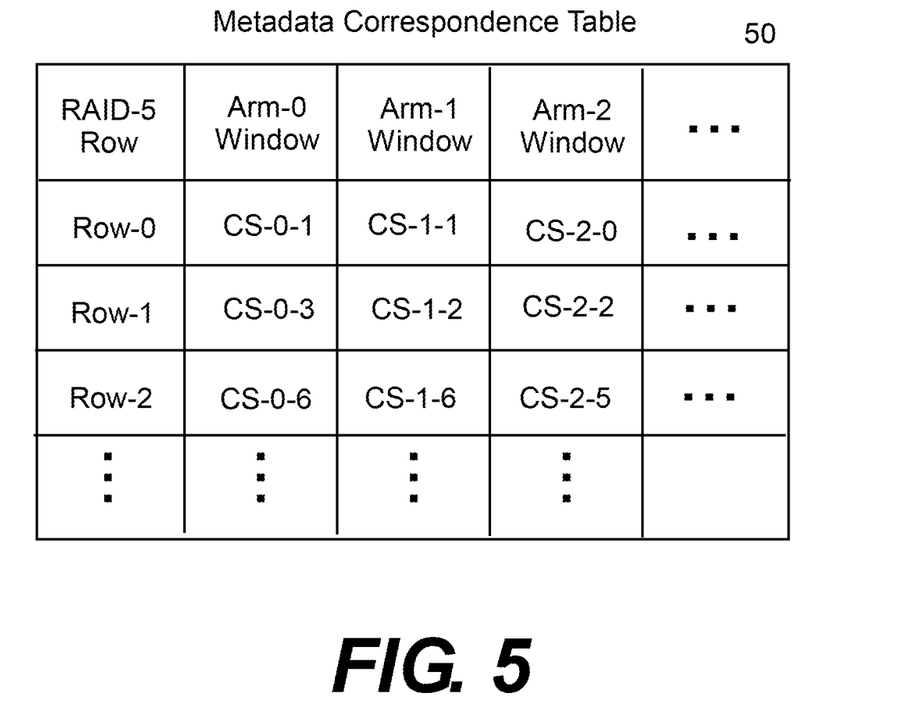
FIG. 5 is an example of metadata correspondence table for the particular data allocation example of FIG. 4.

Data block (6) is another write block for which Row-1 is allocated, consisting of CS-0-3, CS-1-2 and CS-2-2. Again, it will be understood that while data block (6) is denoted as a single block in FIG. 4 for illustrative convenience, data block (6) may in practice consist of several write data blocks received at different times until Row-1 is filled. FIG. 5 shows the correspondence for Row-1 in the table 50. After write Row-1 has been allocated, data block (7) is a read block loaded into CS-1-3 as the window in the lowest numbered arm with the highest number of available blocks. Data block (8) is a read block loaded into CS-2-3 as Arm-2 has the highest number of available blocks at this point. Data blocks (9)-(13) are also assumed to be read block loaded into windows having the highest number of available blocks with the lowest numbered arm loaded first in this particular example.

Data block (14) is another write block for which Row-2 is allocated, which consists of CS-0-6, CS-1-6 and CS-2-5. FIG. 5 shows this correspondence for Row-2 in the table 50. To finish the example, data block (15) is a read block loaded into CS-2-6. As noted, this is merely an illustrative example and other data structures loaded on the fly may differ and the loading protocol may be varied somewhat so long as no-parity windows and single-parity rows are allocated as needed on a flexible basis.

The present invention may consist (but not required to consist) of adapting or reconfiguring presently existing systems. Alternatively, original equipment may be provided embodying the invention.

All of the methods described herein may include storing results of one or more steps of the method embodiments in a storage medium. The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc. Furthermore, the results may be stored "permanently," "semi-permanently," temporarily, or for some period of time. For example, the storage medium may be random access memory (RAM), and the results may not necessarily persist indefinitely in the storage medium.

It is further contemplated that each of the embodiments of the method described above may include any other step(s) of any other method(s) described herein. In addition, each of the embodiments of the method described above may be performed by any of the systems described herein.

Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected", or "coupled", to each other to achieve the desired functionality, and any two components capable of being so associated can also be viewed as being "couplable", to each other to achieve the desired functionality. Specific examples of couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

Furthermore, it is to be understood that the invention is defined by the appended claims.

Although particular embodiments of this invention have been illustrated, it is apparent that various modifications and embodiments of the invention may be made by those skilled in the art without departing from the scope and spirit of the foregoing disclosure. Accordingly, the scope of the invention should be limited only by the claims appended hereto.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

The invention claimed is:

1. An elastic cache system for non-transitory storage of electronic computer data, comprising:
   an array of physical memory devices divided into a stripe configuration containing a plurality of stripes in which each stripe comprises one window of like size from each physical memory device;
   a metadata storage device configured to store metadata describing data stored in the physical memory devices;
   a cache controller configured to load the physical memory devices with a combination of no-parity data blocks and single-parity data blocks;
   wherein the metadata storage device is updated each time the single-parity data blocks are allocated to allow loading of the no parity data blocks and the single-parity data blocks into a same cache array as a data storage requirement develops;
   wherein the cache controller is further configured to allocate an individual window for each block of read data in which the read data is stored in a no-parity format;
   wherein the cache controller is further configured to allocate a row comprising a window from each physical memory device for each block of write data in which the write data is stored in a single-parity format;
   wherein the rows for storing write data are not bound to the stripes of the physical memory device;
   wherein the single-parity rows are decoupled from the stripe configuration of the physical memory devices; and
   wherein the cache controller is further configured to update the metadata in association with allocating a single parity row for write data to correlate the windows comprising the row to the stripe configuration.

2. The elastic cache system of claim 1, wherein the metadata is stored in a portion of the physical memory devices.

3. The elastic cache system of claim 1, wherein each stripe comprises a number "N" windows and the metadata is stored "N−1" windows of the physical memory devices.

4. The elastic cache system of claim 1, wherein the read data is stored in RAID-0 format.

5. The elastic cache system of claim 1, wherein the write data is stored in RAID-5 format.

6. The elastic cache system of claim 1, wherein the read data is stored in RAID-0 format and the write data is stored in RAID-5 format.

7. The elastic cache system of claim 1, wherein in response receiving a request to allocate a read block, the cache controller is further configured to determine a physical drive with a highest number of available windows and allocate a window for the read block in the physical drive with a highest number of available windows.

8. The elastic cache system of claim 1, wherein in response to receiving a request to allocate a data block for write data, the cache controller is further configured to allocate a single parity row for the write data in which windows of the row exist in different strips of the physical devices.

9. The elastic cache system of claim 1, in which the physical memory devices comprise an Solid State Device (SSD) cache array.

10. The elastic cache system of claim 1, in which the physical memory devices comprise a secondary SSD cache array in a tiered SSD cache system.

11. A method for storing non-transitory computer cache data in an elastic cache array containing a plurality of physical memory devices, wherein the cache data includes a combination of no-parity data blocks and single-parity data blocks, comprising:
 dividing the cache array into a stripe configuration containing a plurality of strips in which each stripe comprises one window of like size from each physical memory device;
 providing a metadata storage device configured to store metadata describing data stored in the physical memory devices;
 allocating an individual window for each block of read data in which the read data is stored in a no-parity format;
 allocating a single parity row comprising a window from each physical memory device for each block of write data in which the write data is stored in a single-parity format;
 wherein the rows for storing write data are not bound to the stripes of the physical memory device;
 wherein the rows for storing write data are decoupled from the stripe configuration of the physical memory devices; and
 wherein the metadata storage device is updated each time the write data is allocated to allow loading of the read data blocks and the write data blocks into a same cache array as a data storage requirement develops;
 updating the metadata to correlate the windows comprising the rows to the stripe configuration.

12. The method of claim 11, further comprising the step of storing the metadata in a portion of the physical memory devices.

13. The method of claim 11, wherein each stripe comprises a number "N" windows, further comprising the step of storing the metadata in "N−1" windows of the physical devices.

14. The method of claim 11, further comprising the step of storing the read data is stored in RAID-0 format.

15. The method of claim 11, further comprising the step of storing the write data in RAID-5 format.

16. The method of claim 11, further comprising the step of storing stored in RAID-0 format and the write data is stored in RAID-5 format.

17. The method of claim 11, further comprising the step of receiving a request to allocate a read block, determining a physical drive with a highest number of available windows, and allocating a window for the read block in the physical drive with a highest number of available windows.

18. The method of claim 11, further comprising the step of receiving a request to allocate a data block for write data, the cache controller is further configured to allocate a single parity row for the write data in which windows of the row exist in different strips of the physical devices.

19. The method of claim 11, further comprising the step of configuring the elastic cache in an SSD cache array.

20. The method of claim 11, further comprising the step of configuring the elastic cache in a secondary SSD cache array is a tiered cache system.

21. A method for storing non-transitory computer cache data in an elastic cache array containing a plurality of physical memory devices, comprising:
 providing a plurality of physical memory devices
  providing a metadata storage device configured to store metadata describing data stored in the physical memory devices;
  receiving a first block;
  receiving a first parity indication associated with the first data block indicating an assignment of no-parity storage for the first data block;
  storing the first data block in the physical memory devices without parity in accordance with the first parity indication;
  receiving a second parity indication associated with the second data block indicating an assignment of parity storage for the second data block;
  storing the second data block in the physical memory devices with parity in accordance with the second parity indication; and
  updating the metadata to correlate the first and second data blocks with storage locations for the first and second data blocks in the physical memory devices;
  wherein the metadata storage device is updated each time the single-parity data is allocated to allow loading of the no parity data blocks and the single-parity data blocks into a same cache array as a data storage requirement develops; and
  wherein the single-parity rows are decoupled from the stripe configuration of the physical memory devices.

22. The method of claim 21, further comprising the step of storing the metadata in a portion of the physical memory devices.

23. The method of claim 21, further comprising the step of configuring the physical memory devices as an elastic cache in an SSD cache array.

24. The method of claim 23, further comprising the step of configuring the elastic cache in a secondary SSD cache array is a tiered cache system.

* * * * *